Jan. 24, 1956     I. G. BURNS     2,731,999
PROTECTIVE COVER DEVICE
Filed Oct. 12, 1953
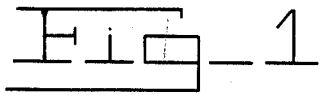
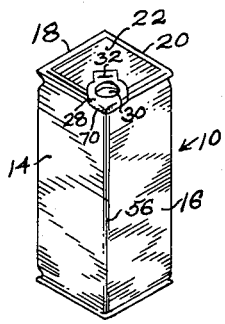
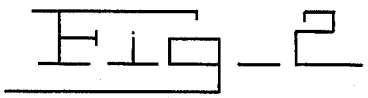
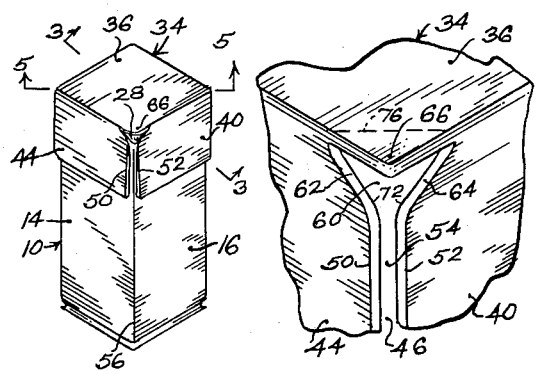
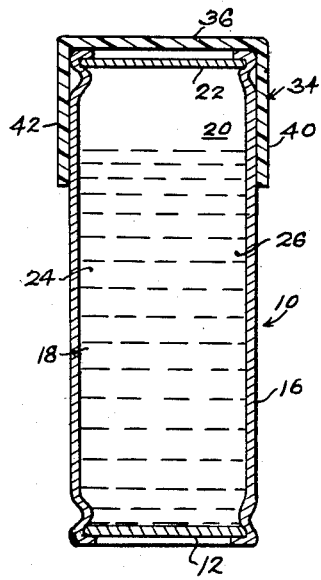
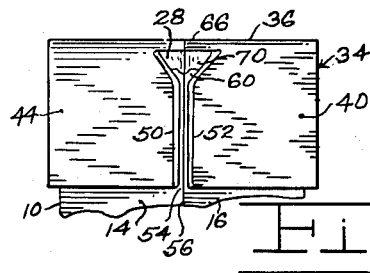
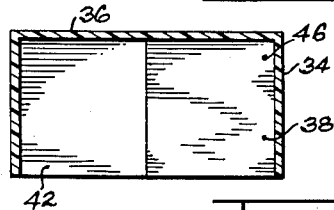
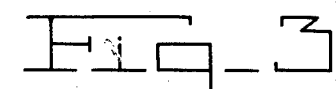
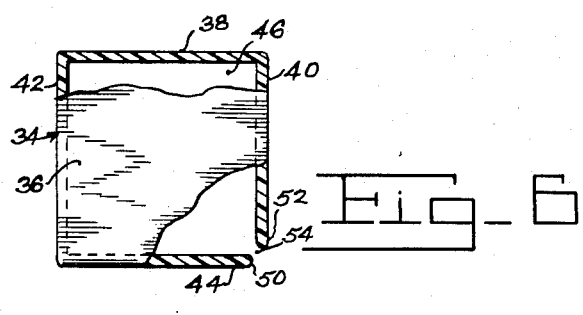
INVENTOR.
Ida Grace Burns
BY
Peter Fries, Jr.
ATTORNEY United States Patent Office 2,731,999
Patented Jan. 24, 1956

2,731,999
PROTECTIVE COVER DEVICE
Ida Grace Burns, New York, N. Y.
Application October 12, 1953, Serial No. 385,365
6 Claims. (Cl. 150—52)

This invention relates to cover devices and the like.

An object of the invention is to provide a novel and improved cover device which may be used to cover the upper portions of containers, for the protection thereof.

Another object of the invention is to provide a novel and improved cover device, which is of particular utility as a protective device for the upper portions of milk and cream cartons or containers, of the type which are made of waxed paperboard or cardboard, and in which milk and cream are sold and distributed.

A further object of the invention is to provide a novel and improved protective cover device, which is formed of a single integral wall construction, so that it does not have any hidden crevices or seams into which dirt or other contaminating elements may lodge, so that it is perfectly sanitary at all times, and readily and easily thoroughly cleaned by ordinary washing processes in the home or restaurant.

Still another object of the invention is to provide a novel cover device in the form of a housing which is downwardly open to provide a recess for the reception of the upper end of a milk or cream carton or container or the like, the recess being shaped to conform snugly to the contours of the milk carton or container, so that it will slip easily thereon and yet fit snugly for protection thereof, the housing being so constructed as to permit ready yielding of its walls to interfit with the milk carton, yet to avoid binding, so that it is easily placed into position thereon, and removed therefrom without any inconvenience whatever.

Still a further object of the invention is to provide a novel and improved protective cover device of the character described, which may be formed entirely in one piece, of plastic sheet material, especially of the softer plastics, such as polyethylene and the like, for ready conformance to the shape of the milk carton, and easy yielding to permit snug fit therewith.

Another object of the invention is to provide a novel and improved protective cover device in which there is a cut-away portion at the intersection of two of the side walls, with a recess formed therein for engaging the lip of the hinged cover of a milk and cream carton or the like, and for clamping the same down firmly to maintain the carton in closed disposition.

Still another object of the invention is to provide a novel and improved protective cover device which is simple in design, inexpensive to manufacture, highly efficient in use, and effective in achieving its objectives.

These and other objects and advantages of the invention will become apparent from the following description of a preferred embodiment thereof, as illustrated in the accompanying drawings, forming a part hereof, and in which, Figure 1 is a perspective view showing a form of milk and cream carton or container for use with the device of the invention; the closure member thereof being shown in closed position.

Figure 2 is a perspective view showing the protective cover device in position on the carton of Figure 1, for clamping down the closure member of the carton and protecting the top portion thereof.

Figure 3 is a vertical sectional elevational view of the combined assembly shown in Figure 2, such as might be seen substantially on plane 3—3 of Figure 2.

Figure 4 is a fragmentary front elevational view of the device shown in Figure 2, but on an enlarged scale, showing the clamping engagement of the protective cover device on the carton top and closure.

Figure 5 is a sectional elevational view of the protective cover device only, as seen substantially on plane 5—5 of Figure 2.

Figure 6 is a top plan view of the protective cover device shown in Figure 3, the view being partly cut away to illustrate the underlying construction thereof.

Figure 7 is a fragmentary perspective view similar to that of Figure 2, but on an enlarged scale, of the protective cover device.

In connection with the ever-increasing use of milk cartons for milk and cream, which are made of paper board, wax impregnated cardboard, and the like, or plastic sheet material, it is important that the top of the carton be protected from dust and dirt, and from contamination. In addition, the closure members are easily loosened, so that they do not close securely, and means must be provided to keep them clamped closed to protect their contents. The present invention teaches such a device, which achieves all these objectives.

In order to understand clearly the nature of the invention and the best means for carrying it out, reference may now be had to the drawings, in which like numerals denote similar parts throughout the several views.

As shown, there is a milk carton generally indicated at 10, and including a bottom wall 12 secured to four upstanding side walls such as 14, 16, 18 and 20, also secured at the top to the ceiling or roof member or wall 22, to define an interior chamber 24 for the reception of milk or cream 26. An opening is perforated or formed through the top wall 22, for pouring out the milk or cream, and a closure member 28, also formed of paper board or the like, is secured over the opening, being indented somewhat at 30 to interfit with the opening, and is hinged as at 32 by means of a staple or the like, to one margin of the discharge opening, being thus capable of being tilted upwards to uncover the dispensing opening, to discharge the contents thereof.

To protect the milk carton, I provide the protective cover device generally indicated at 34. This includes a top wall 36 secured at its edges to depending side and end walls 38, 40, 44 and 42, these walls being either integral therewith or secured thereto. By making the walls 36 to 44 of sheet material such as waxed paperboard, cardboard, plastic or the like, or of metal, they may be formed in lightweight construction. The walls are so dimensional as to define a downwardly open chamber or recess 46 which fits snugly with the outer surfaces of the milk carton 10, so as to hug the same securely, yet permit ready pulling or lifting off thereof when desired. The walls 44 and 40 are recessed at their abutting margins, as at 50 and 52, to define a corner slot or groove 54 which is intended to overlie the corner 56 of the milk carton 10 which is below the lip of the closure member 28. Also the slot 54 is enlarged at its upper end, as at 60, by forming the angularly inclined cut edges 62 and 64 in the walls 44 and 40 as seen best in Figure 7, leaving the top wall 36 extending outwardly thereover as at 66.

It is thus seen that when the closure 28 is moved generally toward closed position, on the milk carton, and the protective cover device 34 placed snugly thereon, to engage the entire top of the carton 10, it forces down the closure 28 to hold it securely in closed position, with the lip 70 of the closure 28 clamped in the opening 60 and gripped firmly therein above the knees 72 of the opening 60, the lip 70 extending slightly inside opening 60.

According to a modified form of the invention, as seen in Figure 7, the corner projection 66 of the top wall 36 of the cover device, may be omitted, that is, cut off along the line 76. Also, the walls 40 and 44 may be so molded or formed as to give their knees 72 a resilient inherent bias inwardly so as to further enhance the snug resilient grasping action on the underlying portion of the carton 10, and to aid further in holding the closure 28 in closed position.

Although I have described my invention in specific terms, it will be understood that various changes may be made in size, shape, materials and arrangement without departing from the spirit and scope of the invention as claimed.

I claim:

1. A carton cover device comprising a top wall, a pair of side walls depending substantially perpendicularly from side edges of said top wall, a pair of end walls depending from end edges of said top wall, and combining therewith to define a downwardly open chamber for the reception of the upper portion of a container or the like, abutting marginal portions of one of said side walls and one of said end walls adjacent thereto being free from mutual direct engagement with each other, to define therebetween a marginal elongated opening communicating with the interior of said downwardly open chamber, and arranged for snug interfitting engagement with one of the corner edges of said container.

2. A carton cover device comprising a top wall having end and side edges, first and second end walls depending from said end edges of said top wall, first and second side walls depending substantially perpendicularly from the said side edges of said top wall, and combining therewith to define a downwardly open chamber of substantial depth for engagement over the top portion of a container or the like, abutting marginal portions of one of said side walls and one of said end walls adjacent thereto being free from mutual direct engagement with each other, to define therebetween a downwardly open slotted opening communicating with the interior of the said chamber, and wherein said slotted opening is enlarged at its upper end to receive and engage with an underlying closure portion of said container when engaged therewith.

3. The construction according to claim 2, characterized further in that said top wall is substantially planar, and said depending side and end walls are also substantially planar, are of substantial depth, and are all normally disposed in planes substantially perpendicular to the plane of said top wall.

4. The construction according to claim 2, characterized further in that said top wall is substantially planar, and said depending side and end walls are also substantially planar, and are all normally disposed in planes substantially perpendicular to the plane of said top wall, said depending walls being formed of sheet material, and constructed and arranged for snugly grasping said container when in engagement therewith, and for ready release from said engagement by a firm pull upwards on said cover device.

5. The construction according to claim 2, characterized further in that said enlarged upper end portion of said slotted opening is substantially triangular when viewed in elevation, and an overhanging roof porch section overlying the same.

6. The construction according to claim 2, characterized further in that said enlarged upper end portion of said slotted opening is substantially triangular when viewed in elevation, with the base of said triangular shape uppermost and formed by the edge of said top wall member forming a lip thereover, with inherent inward gripping bias.

References Cited in the file of this patent

UNITED STATES PATENTS

| | | |
|---|---|---|
| 799,578 | Sexton | Sept. 12, 1905 |
| 1,644,001 | Telschow | Oct. 4, 1927 |
| 1,690,308 | Nivois | Nov. 6, 1928 |
| 2,148,319 | Negbaur | Feb. 21, 1939 |